United States Patent [19]
Nakajima et al.

[11] 3,930,876
[45] Jan. 6, 1976

[54] INORGANIC COATING COMPOSITION

[75] Inventors: Jun Nakajima, Kyoto; Hiroshi Iwai, Hiratsuka; Iwao Momiyama, Hiratsuka; Tatsuo Fukushima, Hiratsuka; Rentaro Takeda, Hiratsuka, all of Japan

[73] Assignees: Matsushita Electric Works, Ltd.; Kansai Paint Company, Ltd., both of Japan

[22] Filed: June 17, 1974

[21] Appl. No.: 480,258

Related U.S. Application Data

[62] Division of Ser. No. 228,388, Feb. 22, 1972, abandoned.

[52] U.S. Cl. .................................... 106/74; 106/84
[51] Int. Cl.² .................... C09D 1/02; C09J 1/02
[58] Field of Search ............................. 106/84, 74

[56] References Cited
UNITED STATES PATENTS

3,669,699   6/1972   Doi et al. .............................. 106/84

*Primary Examiner*—J. Poer
*Attorney, Agent, or Firm*—Armstrong, Nikaido & Wegner

[57] ABSTRACT

An improved silicate-phosphate type inorganic coating composition having a long pot life or shelf life is provided which comprises a water soluble silicate or modified silicate and an inorganic phosphate pretreated with such silicate.

7 Claims, No Drawings

INORGANIC COATING COMPOSITION

This is a division of application Ser. No. 228,388, filed Feb. 22, 1972, now abandoned.

This invention relates to an improved inorganic coating composition and also to a process for preparing such coating composition. This invention also relates to the formation of an improved inorganic coating.

It is known to form a fireproof protective inorganic coating on a substrate such as metal and other inorganic body. Most typically, such inorganic coating is prepared from an aqueous inorganic coating composition comprising an alkali metal silicate and a hardner therefor (i.e. inorganic phosphate). Such inorganic coating composition, however, has various drawbacks among which are that the pot-life is relatively short due to strong reactivity between the silicate and phosphate and that the resulting coating is not satisfactory in resistance to water, cracking, efflorescence, weather, chemicals, etc.

Therefore it is an object of this invention to provide an improve silicate-phosphate type inorganic coating composition having a long pot life or shelf life.

Another object of this invention is to provide an improved silicate-phosphate type inorganic coating composition which enables the formation of an improved inorganic coating with excellent resistance to water, cracking, efflorescense, weather, chemicals, etc.

Still another object of this invention is to produce such improved coating composition.

Another object of this invention is to provide an improved inorganic coating by the use of such improved coating composition.

Other objects of this invention will be apparent from the following description.

Briefly, the present invention provides an aqueous inorganic coating composition which comprises a water soluble silicate or modified silicate and an inorganic phosphate pretreated with such silicate.

The water-soluble silicate to be used in this invention is selected from the group consisting of (1) silicates of the formula:

$$M_2O \cdot xSiO_2 \qquad [I]$$

wherein M represents a member selected from the group consisting of alkali metals such as sodium, potassium and lithium, $-N(CH_2OH)_4$, $-N(C_2H_4OH)_4$ and $-C(NH_2)_2NH$, and $x$ is a number of from 0.5 to 5 inclusive, (2) silicates of the formula [I] modified with at least one fluoride or silicofluoride of Ca, al, Mg, Zn or Zr, and (3) silicates of the formula [I] modified with at least one oxide or hydroxide of a metal selected from the group consisting of Al, Ca, Mg, Zr, V, Zn and Cs. A mixture of two or more of these silicates may also be used.

The silicates of the formula [I] are alkali metal silicates, quaternary ammonium silicates, guanidine silicates, etc. More particular examples thereof are sodium silicate, potassium silicate, lithium silicate, tetra-methanol-ammonium silicate, tetra-ethanol-ammonium-silicate, etc. These may be commercially available ones.

The silicates of the formula [I] may contain the usual water of crystallization and may be used as such. However, in order to improve the properties of the resulting inorganic coating it is preferable to modify the same with such fluoride, silicofluoride, oxide or hydroxide as mentioned before. The modification may be conducted, for example, as follows.

Thus the fluoride or silicofluoride-modified silicate may be obtained by mixing an aqueous solution of a silicate of the formula [I] with one or more of fluorides or silicofluorides of calcium, aluminum, magnesium, zinc or zirconium and heating the mixture while stirring. Usually, the heating is conducted at about 50°–100°C. for about 1 – 72 hours. However, if the reaction is conducted in a pressure vessel at a temperature higher than 100°C. the reaction time may be shorter. The fluoride or silicofluoride may be used in an amount of 0.5 – 30 parts by weight based on 100 parts by weight (as dry solid without crystallization water) of the silicate. Preferable examples of the fluorides or silico-fluorides which may be used for this modification are calcium fluoride, aluminum fluoride, calcium silicofluoride, magnesium silicofluoride, zinc fluoride, zirconium silicofluoride, magnesium fluoride, fluoroaluminum complex, fluorozinc complex, etc.

The oxide- or hydroxide-modified silicate may be obtained by mixing an aqueous solution of an oxide or hydroxide of a metal selected from the group consisting of Al, Ca, Mg, Zr, V, Zn and Cs, and heating the mixture while stirring in the same manner as explained before for the production of fluoride- or silicofluoride-modified silicates. The amount of the oxide or hydroxide may be 0.5 – 30 parts by weight per 100 parts by weight (as dry solid without crystallization water) of the silicate. Preferable examples of the oxides or hydroxides are aluminum oxide, magnesium oxide, calcium oxide, zinc oxide, zirconium oxide, cesium oxide, aluminum hydroxide, magnesium hydroxide, calcium hydroxide, zirconium hydroxide, etc.

The above water-soluble silicate or modified silicate in the form of an aqueous solution, slurry, paste or the like is mixed with a phosphate to form a coating composition. However when the silicate or modified silicate is mixed with a conventional phosphate type hardener there occurs local coagulation, solidification or the like due to strong reactivity between the silicate and phosphate. Therefore, a long pot life or shelf life can not be obtained. Even if such local coagulation does not occur, the temperature and pH are decreased in the mixture due to the immediate reaction between the silicate and a part of the phosphate so that the phosphate will be undesirably decomposed or deteriorated into such substances which do not effectively function as a hardener for the silicate solution. Therefore even such coating composition is applied on the surface of a substrate there can not be formed a coating having excellent properties.

We have found that when such phosphate type hardener is subjected to a certain pretreatment before mixing with the silicate solution, the above drawbacks are overcome and there is obtained an improved coating composition which has good pot life and which can form an inorganic coating having excellent properties.

The phosphate itself may be any conventional one which is known as a hardener for a silicate type inorganic paint or coating composition, although it is preferable to modify such phosphate as explained hereinlater, prior to the pretreatment.

The phosphate to be used here has the following average composition formula:

$$M_iO_j \cdot mP_2O_5 \qquad [II]$$

wherein M represents a metal selected from the group consisting of Al, Mg, Ca, Mn, Zn, Fe and Cu, $i$ is 1 or 2 and $j$ is 1 or 3 depending upon the valency (2 or 3) of the metal M, and $m$ is a number from 0.25 to 4 inclusive. The phosphate may or may not contain water of crystallization. The phosphate of the formula [II] may be one or a mixture of two or more of commercially available primary phosphates of Ca, Mg, Al, Cu, Fe, Mn and Zn. If desired, the primary phosphate may be mixed with one or more of secondary phosphates such as $2Al_2O_3.3P_2O_5.3H_2O$, $2CaO.P_2O_5.H_2O$, $2MgO.P_2O_5.H_2O$, etc.; sesquiphosphates such as $Al_2O_3.2P_2O_5.3H_2O$; and $CaH_2P_2O_7$, etc. Even in a form of mixture, it should satisfy the above formula [II].

It is preferable however that the phosphate of the formula [II] is modified or neutralized with a double oxide with spinel structure prior to the pretreatment to be explained later. Thus, the phosphate is mixed with a double oxide having a spinel structure and then the mixture is heated to react forming a "condensed phosphate".

The double oxide to be mixed with the phosphate must have the so-called "spinel" structure. The metals forming the double oxide should comprise both (a) one metal selected from Zn, Mg and Ca and (b) at least one metal selected from transition metals and metals belonging to Group IV of Periodic Table. Preferable metals of (a) are zinc and magnesium, while preferable metals of (b) are Ti, Al and Fe.

The double oxides may be prepared in any known manner. Thus, for example, one metal compound selected from the group consisting of oxides, hydroxides, carbonates and organic acid salts of metals Zn, Mg and Ca is mixed with at least one metal compound selected from the group consisting of oxides, hydroxides, carbonates and organic acid salts of metals belonging to Group IV of Periodic Table and transition metals. The mixture is calcinated at a temperature from 700°C. to 1200°C. for 2 – 15 hours to form a double oxide with spinel structure. The proportions of the various metal compounds and the temperature and time for the calcination are determined in order to form double oxides with spinel structure. These conditions of course vary depending upon the particular metal compounds, but can be easily determined by referring to known literatures relating to the production of spinel type double oxides. In any case the metal compounds to be used should be those which can form oxides upon the above mentioned calcination.

Preferable double oxide systems are $ZnO-TiO_2$, $MgO-TiO_2$, $CaO-TiO_2$, $MgO-Fe_2O_3$ and $ZnO-Al_2O_3$.

The double oxide is mixed with the phosphate to cause reaction or neutralization therebetween. In order to facilitate the reaction it is preferable to conduct the mixing in a wet system or in the presence of water. However, in such case the resulting product tends to become a high viscous massive material and it is very difficult to handle and uniformly mix the same. This difficulty is overcome if powder of a siliceous material such as $SiO_2$ powder is added in the mixture. Such siliceous material may be added in an amount of 5 – 40 % by weight based on the phosphate. The addition of such siliceous material would be useful also for improving the chemical resistance and hardness of the coating to be formed from the coating composition.

The reaction product of the above mentioned phosphate and double oxide is heated to prepare the "condensed phosphate". Generally, the double oxide is used in an amount of 0.2 – 1.5 parts by weight per part of the phosphate. The heat treatment conditions may vary over a wide range depending upon the particular apparatus (type of furnace) and particle size of the materials to be heated. However, generally, the mixture is heated at a temperature of 100°– 400°C., preferable 120°– 350°C. for 30 minutes to 10 hours, preferably 2 – 7 hours.

After the heat treatment or calcination the resulting solid mass (condensed phosphate) is pulverized into fine powder.

The phosphate of the formula [II] or its condensed phosphate with the double oxide prepared as mentioned above is useful as a hardener for an aqueous solution of the silicate of the formula [I] or modified silicate mentioned before. However, when the phosphate or condensed phosphate is mixed with the silicate or modified silicate solution there would occur partial coagulation or solidification so that within a relatively short period of time it would become difficult to satisfactorily apply to the surface of a substrate. Even if the application is possible there is not obtained a coating with excellent properties as explained hereinbefore.

In order to overcome these difficulties, according to the invention, the above mentioned phosphate or condensed phosphate or a mixture thereof is subjected to a certain pretreatment prior to being mixed with an aqueous solution of the silicate or modified silicate.

Thus according to the present invention, the above mentioned phosphate or condensed phosphate is pretreated with a silicate or modified silicate which may be same as the silicate or modified silicate explained hereinbefore. Thus the silicate or modified silicate to be used for the pretreatment of the above mentioned phosphate or condensed phosphate (sometimes referred to as "phosphate type hardener" hereinafter) is a silicate of the formula [I] modified or not modified with a fluoride or silicofluoride of Ca, Al, Mg, Zn or Zr or with an oxide or hydroxide of a metal selected from the group consisting of Al, Ca, Mg, Zr, V, Zn and Cs, the modification being conducted in the same manner as explained before.

The pretreatment may be conducted by mixing the phosphate type hardener in the form of powder with an aqueous solution of the silicate or modified silicate. However, since the reactivity between the silicate and phosphate type hardener is high, there is a tendency that the mixture will become massive. Therefore it is preferable to conduct the pretreatment while stilling or kneading the mixture by a suitable mechanical mill such as ball mill, pebble mill, colloid mill, sand mill or the like. Generally, about 300 – 2000 parts by weight (as dry solid) of the phosphate type hardener (phosphate or condensed phosphate) are used per 100 parts by weight (as dry solid) of the silicate or modified silicate. The amount of water is not critical so far as the mixture is in the form of a slurry or paste and can be uniformly mixed. Usually water content based on the total dry mixture is at least 20 %, preferably 50 – 100 % by weight. In order to facilitate the dispersing or mixing it is preferable to add a small amount (e.g. up to 5 % based on the total mixture) of a dispersing agent such as sodium tripolyphosphate, sodium hexamethaphosphate, etc. The pretreatment is conducted at the room or normal temperature or without any external heating. The pretreatment is conducted until the resulting slurry or paste will have a pH of 5 – 9.5, preferably 6 – 8.5. The time required would vary depending upon the particular reactants, amount and efficiency of mixing, but generally it takes 10 – 30 hours.

By this treatment, there occurs a reaction of the silicate with any free acid present in the system and also with the surface portion of the phosphate (or condensed phosphate) particles so that the phosphate particles are coated with an inert material containing no free acid and therefore rendered less reactive. Therefore, when the pretreated phosphate type hardener is mixed with an aqueous alkaline solution of a silicate, there does not immediately occur a reaction in the resulting coating composition or paint, which therefore is stable and has a long shelf life at the room or normal temperature. However when the paint is applied on the surface of a substrate and heated there gradually occurs a reaction at a temperature high than 100°C. and the reaction remarkably proceeds at a temperature higher than 150°C. while the water in the coating is evaporated. Thus there is formed a firmly adherent, hard and inorganic film which is excellent in the resistance to fire, water, hot water, chemicals (acids and alkalis), weather, crack and efflorescence. The resulting film is firmly adhered to the substrate and has a smooth and ceramic like luster in appearance.

If desired an inorganic filler (e.g. clay, bentonite, sand, calcium carbonate, gypsum, furnace waste, mica, etc.) and/or pigment (e.g. ferric oxide, titanium dioxide, chrome oxide green, etc.) may be incorporated. Preferably each of the filler and/or pigment is used in an amount of 60 % by weight or less based on the pretreated phosphate type hardener. The filler and/or pigment may be added during and/or after the pretreatment of the phosphate type hardener.

In preparing the coating composition or paint, the aqueous solution of the silicate or modified silicate and the slurry or paste of the pretreated phosphate type hardener are mixed together to form a uniform composition. Generally, the pretreated phosphate type hardener (as dry solid) is used in an amount of 60 – 150 parts by weight based on 100 parts by weight of the silicate or modified silicate (as dry solid). The amount of water is not critical so far as the resulting aqueous coating composition or paint can be applied as a thin film on the surface of a substrate in a conventional manner such as spraying, brushing, roller coating, printing or the like. Generally water content in the coating composition is about ¼ to 2 parts by weight per part of the total solid (dry) in the composition.

The aqueous coating composition of this invention which is in the form of slurry or paste may be applied to the surface of an article in any suitable manner such as spraying, brushing, roller coating, etc. If desired this composition may be used also as a printing ink.

The coating may be applied to any solid substrate which can withstand a high temperature as about 250°C., for example various articles made of asbestos, cement, concrete, mortar, calcium silicate, gypsum, bricks, glass and other inorganic building materials, ceramic articles, and metal articles.

As mentioned before the coating is not cured at the room temperature within a reasonably short time. Therefore the coated film must be baked at a temperature of 150°– 250°C. until it is completely hardened. Usually it takes about 20 – 30 minutes.

The resulting hardened film has excellent properties as explained before.

The invention will be illustrated in the following Examples wherein all parts are by weight. In these Examples, the various properties of the coating compositions and hardened films formed therefrom were determined as follows.

| (1) | Pot life | : Freshly prepared coating composition (800 ml.) was put into a sealed vessel of polyethylene and stored at 50°C. to measure the time before the composition is gelled. |
| --- | --- | --- |
| (2) | Resistance to water | : Dipped in water at 20°C. for 500 hrs. and the surface of the film was observed. |
| (3) | Resistance to weather | : Using Weather-O-Meter (sun shine carbon arc), test was conducted for 500 hrs. under JIS X 5400 6.16. |
| (4) | Resistance to hot water | : Dipped in boiling water (100°C.) for 3 hrs. and the film surface was observed. |
| (5) | Resistance to efflorescence | : A rectangular vessel (100 l. volume) of polyethylene was charged with water in 5 cm. depth, and 2 kg. of dry ice was put into water to generate $CO_2$ gas creating a wet atmosphere filled with $CO_2$ gas. A sample was placed in such atmosphere at 20°C. for 24 hrs. and the film surface was observed. |
| (6) | Resistance to acid | : Dipped in 3 % HCl aqueous solution for 5 hrs. and the film surface was observed. |
| (7) | Resistance to alkali | : Dipped in 3 % NaOH aqueous solution for 5 hrs. and the film surface was observed. |
| (8) | Adherence | : Cross-cut scotch tape test was conducted. |

A. Preparation of various aqueous solutions of modified silicates used in the examples is as follows:

Preparation A-1

90 parts of 50 % aqueous solution of sodium silicate ($SiO_2/Na_2O = 3$) which is commercially available and 10 parts of calcium fluoride were mixed together and the mixture was heated at 80°C. for 72 hours while stirring to obtain an aqueous solution of modified silicate (referred to as Binder X-1).

Preparation A-2

20 parts of 30 % aqueous solution of potassium silicate ($SiO_2/K_2O = 3$), 40 parts of 25 % aqueous solution of lithium silicate, 3 parts of aluminum fluoride and 1 part of zinc fluoride were mixed together and the mixture was heated at 60°C. for 10 hours while stirring to obtain an aqueous solution of modified silicate (referred to as Binder X-2).

Preparation A-3

70 parts of 40 % aqueous solution of sodium silicate ($SiO_2/Na_2O = 3$), 20 parts of 20 % aqueous solution of tetra-ethanol-ammonium silicate and 9 parts of zinc silico-fluoride were mixed together and the mixture was heated at 80°C. for 24 hours while stirring to obtain an aqueous solution of modified silicate (referred to as Binder X-3).

Preparation A-4

90 parts of 50 % aqueous solution of sodium silicate ($SiO_2/Na_2O = 2$), 10 parts of magnesium silicofluoride and 60 parts of water were mixed together and the mixture was heated at 160°C. (pressure 10 atmospheres) for 3 hours while stirring to obtain an aqueous solution of modified silicate (referred to as Binder X-4).

Preparation A-5

90 parts of 50 % sodium silicate ($SiO_2/Na_2O = 2$), 8 parts of calcium fluoride and 2 parts of $2MgF_2 \cdot B_4F_2$ were mixed together and the mixture was heated at 80°C. for 12 hours while stirring to obtain an aqueous solution of modified silicate (referred to as Binder X-5).

Preparation A-6

100 parts of 50 % aqueous solution of sodium silicate ($SiO_2/Na_2O = 2$), 1 part of zinc oxide and 10 parts of water were mixed together and the mixture was heated at 50°C. for 72 hours while stirring to obtain an aqueous solution of modified silicate (referred to as Binder X-6).

Preparation A-7

20 parts of 30 % aqueous solution of potassium silicate ($SiO_2/K_2O = 3$), 40 parts of 25 % aqueous solution of lithium silicate ($SiO_2/Li_2O = 4$), 3 parts of MgO and 1.1 parts of $Al_2O_3$ were mixed together and the mixture was heated at 100°C. for 10 hours while stirring to obtain an aqueous solution of modified silicate (referred to as Binder X-7).

Preparation A-8

60 parts of 40 % aqueous solution of sodium silicate ($SiO_2/Na_2O = 3$), 20 parts of 20% aqueous solution of tetra-ethanol-ammonium silicate (x = 5) and 5 parts of $ZrO_2$ were mixed together and the mixture was heated at 80°C. for 24 hours while stirring to obtain an aqueous solution of modified silicate (referred to as Binder X-8)

B. Preparation of various condensed phosphates.

Preparation B-1

A mixed phosphate (m = 2) consisting of 50 parts of aluminum monophosphate, 30 parts of zinc monophosphate and 20 parts of calcium pyrophosphate was mixed with 30 parts of $ZnFe_2O_4$ (double oxide) and 10 parts of $SiO_2$ powder and the mixture was well mixed in a mixer and heated in steam dryer of 120°C. for 3 hours to obtain condensed phosphate, which was then pulverized (referred to as Condensed phosphate 1).

Preparation B-2

A mixed phosphate consisting of 55 parts of aluminum monophosphate and 45 parts of magnesium monophosphate was mixed with 60 parts of zinc titanate (double oxide prepared by calcinating a 3:2 mixture of ZnO and $TiO_2$ at 1200°C. for 4 hours) and 20 parts of siliceous material powder, and the mixture was heated at 250°C. for 3 hours to obtain a condensed phosphate, which was then pulverized (refered to as Condensed phosphate 2).

Preparation B-3

A mixed phosphate consisting of 70 parts of aluminum monophosphate and 30 parts of aluminum sesquiphosphate was mixed with 150 parts of a double oxide (prepared by calcinating a 1:1 mixture of $Zn(OH)_2$ and $Al(OH)_3$ at 1000°C. for 10 hours) and 30 parts of siliceous stone powder, and the mixture was heated at 160°C. for 5 hours to obtain a condensed phosphate, which was then pulverized (referred to as Condensed phosphate 3).

Preparation B-4

A mixed phosphate consisting of 50 parts of aluminum monophosphate, 30 parts of zinc monophosphate and 20 parts of calcium pyrophosphate was mixed with 30 parts of $ZnFe_2O_4$ (double oxide), 10 parts of silica powder and 100 parts of water, and the mixture was heated at 400°C. for 5 hours to obtain a condensed phosphate, which was then pulverized (referred to as Condensed phosphate 4).

C. Preparation of various phosphate type hardeners.

Preparation C-1

30 parts of Condensed phosphate 1, 5 parts of 30 % aqueous-solution of lithium phosphate ($SiO_2/Li_2O = 4$), 45 parts of water and 20 parts of ferric oxide (pigment) were mixed together in a pebble mill for 12 hours to cause reaction (pretreatment) and to obtain a reddish pasty hardener having an average particle size smaller than 30 $\mu$ (referred to as Hardener Y-1).

Preparation C-2

60 parts of Condensed phosphate 2, 10 parts of aluminum metaphosphate, 13 parts of $TiO_2$ (pigment), 2 parts of talc powder (filler), 30 parts of 50 % aqueous solution of sodium silicate ($SiO_2/Na_2O = 3$) and 80 parts of water were mixed together in a pebble mill for 24 hours to cause reaction (pretreatment) and to obtain a white pasty hardener having an average particle size smaller than 30 $\mu$ (referred to as Hardener Y-2).

Preparation C-3

50 parts of Condensed phosphate 3, 50 parts of 30 % aqueous solution of potassium silicate $SiO_2/K_2O = 3$), 5 parts of mica (filler), 10 parts of chromium oxide green (pigment) and 40 parts of water were mixed together in a pebble mill for 24 hours to cause reaction (pretreatment) and to obtain a green pasty hardener having an average particle size smaller than 30 $\mu$ (referred to as Hardener Y-3).

Preparation C-4

100 parts of Condensed phosphate 4, 20 parts of 50 % aqueous solution of sodium silicate ($SiO_2/K_2O = 2$), 20 parts of water were mixed together in a pebble mill for 10 hours to cause reaction (pretreatment) and to obtain a reddish pasty hardener having an average particle size smaller than 30 $\mu$ (referred to as Hardener Y-4).

Preparation C-5 (Control)

45 parts of aluminum metaphosphate, 10 parts of aluminum orthophosphate, 2 parts of sodium hexametaphosphate, 10 parts of titanium dioxide (pigment) and 33 parts of water were mixed together in a pebble mill for 12 hours to obtain a white pasty hardener having an average particle size smaller than 30 $\mu$ (referred to as Hardener Y-5).

Preparation C-6

20 parts of 50 % aqueous solution of sodium silicate, 20 parts of calcium monophosphate, 25 parts of titanium metaphosphate, 25 parts of ferrous metaphosphate and 100 parts of water were mixed together in a pebble mill for 10 hours to cause reaction (pretreatment) and to obtain a pasty hardener (referred to as Hardener Y-6).

Preparation C-7 (Control)

70 parts of Condensed phosphate 4, 10 parts of titanium dioxide (pigment) and 30 parts of water were mixed together to obtain a white pasty hardener (referred to as Hardener Y-7).

D. Preparation of coating compositions.

Examples 1 - 12

100 parts of the binder and 90 parts of the hardener were mixed together to prepare a coating composition. Various combinations of the binders and hardeners are indicated in Table I. In each case the pot life and the time during which the newly prepared coating composition maintained a viscosity under which spray coating is possible were measured. The results are also indicated in Table I as "Spray Ability".

Table I

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Binder | X-1 | X-1 | X-1 | X-1 | * | X-2 | X-3 | X-6 | X-4 | X-5 | X-7 | X-8 | * |
| Hardener | Y-4 | Y-5 | Y-6 | Y-7 | Y-4 | Y-4 | Y-4 | Y-4 | Y-1 | Y-2 | Y-3 | Y-4 | Y-5 |
| Pot life | 48 hrs. | 40 min. | 30 hrs. | 1 hr. | 60 hrs. | 48 hrs. | 30 hrs. | 48 hrs. | 48 hrs. | 48 hrs. | 48 hrs. | 30 hrs. | — |
| Spray Ability | 5 hrs. | 20 min. | 4 hrs. | 30 min. | 8 hrs. | 5 hrs. | 4 hrs. | 5 hrs. | 5 hrs. | 5 hrs. | 5 hrs. | 4 hrs. | ** |

* Commercial 50 % aqueous solution of sodium silicate ($SiO_2/Na_2O = 2$).
** Rapid local coagulation occurred and spray coating was impossible from the beginning.

E. Formation of hard coating.

Each of the coating compositions was spray-coated on the surface of asbestos slate (5 mm. thickness). The thickness of the coated layer was 60 μ. The coated asbestos slate was heated at 180°C. for 30 minutes to bake and harden the coating. The properties of the resulting hard coating are shown in Table II.

TABLE II

| Example | 1 | 2 | 3 | 4 | 5 | 6 | 7 | 8 | 9 | 10 | 11 | 12 |
|---|---|---|---|---|---|---|---|---|---|---|---|---|
| Surface appearance | ● | x | o | x | ● | ● | o | ● | ● | ● | ● | ● |
| Resistance to water | ● | x | o | △ | △ | ● | ● | ● | ● | ● | ● | ● |
| Resistance to boiling water | ● | x | o | x | △ | ● | o | o | o | ● | ● | ● |
| Resistance to acid | ● | x | ● | △ | o | ● | ● | o | ● | ● | o | ● |
| Resistance to alkali | ● | o | ● | o | ● | ● | ● | ● | ● | ● | ● | ● |
| Resistance to weather | ● | x | ● | o | ● | ● | o | ● | ● | ● | o | o |
| Resistance to efflorescence | ● | x | △ | ● | o | o | △ | ● | ● | ● | o | o |
| Adherence | ● | o | ● | ● | ● | ● | ● | ● | ● | o | ● | o |

Remarks:
● Excellent
o Pretty good
△ Good
x Bad

What is claimed is:

1. A method of preparing an aqueous coating composition which comprises mixing (A) a water soluble silicate selected from the group consisting of (1) silicates of the formula:

$$M_2O \cdot xSiO_2 \quad (I)$$

wherein M represents a member selected from the group consisting of alkali metals, $-N(CH_2OH)_4$, $-N(C_2H_4OH)_4$ and $-C(NH_2)_2NH$, and x is a number of from 0.5 to 5 inclusive, (2) silicates of the formula (I) modified with at least one of fluorides of silicofluorides of a metal selected from the group consisting of Ca, Al, Mg, Zn and Zr and (3) silicates of the formula (I) modified with at least one of oxides or hydroxides of a metal selected from the group consisting of Al, Ca, Mg, Zr, V, Zn and Cs, (B) a phosphate type hardener selected from the group consisting of condensed phosphates prepared by heating a mixture of the phosphate of the formula (II):

$$M_iO_j \cdot mP_2O_5 \quad (II)$$

wherein M represents a metal selected from the group consisting of Al, Mg, Ca, Mn, Zn, Fe and Cu, $i$ is 1 or 2 and $j$ is 1 or 3 depending upon the valency (2 or 3) of the metal M and m is a number of from 0.25 to 4 inclusive with at least one double oxides of (i) at least one metal selected from Zn, Mg and Ca and (ii) at least one metal selected from transition metals and metals belonging to Group IV of Periodic Table, the condensed phosphates having been pretreated with at least one of the said silicates (1) or modified silicates (2) and (3) before being mixed with the water soluble silicate (A) and (C) water.

2. A method as claimed in claim 1 wherein the modified silicate (2) is prepared by mixing an aqueous solution of the silicate of the formula (I) with the fluoride or silico-fluoride and heating the mixture, the amount of the fluoride or silicofluoride being 0.5 – 10 parts by weight based on 100 parts by weight (as dry solid) of the silicate.

3. A method as claimed in claim 1 wherein the modified silicate (3) is prepared by mixing an aqueous solution of the silicate of the formula (I) with the oxide or hydroxide and heating the mixture, the amount of the oxide or hydroxide being 0.5 – 30 parts by weight based on 100 parts by weight (as dry solid) of the silicate.

4. A method as claimed in claim 1 wherein the condensed phosphate is prepared by mixing the phosphate of the formula (II) with the double oxide and heating the mixture at 100°– 400°C for 2 – 7 hours, the amount of the double oxide being 0.2 – 2.0 parts by weight per part of the phosphate (a).

5. A method as claimed in claim 1 wherein the pretreatment of the condensed phosphate is conducted by mixing the condensed phosphate with the silicate (1) or modified silicate (2) or (3) in an aqueous system in such a proportion that the resulting slurry would have a pH of 5 – 9.5, preferably 6 – 8.5.

6. A method as claimed in claim 1 wherein the pretreated condensed phosphate is used in an amount of 60 – 150 parts by weight per 100 parts of the silicate (1) or modified silicate (2) or (3).

7. A method of forming an inorganic coating on a substrate which comprises applying to the surface of said substrate an aqueous coating composition prepared by mixing (A) a water soluble silicate selected from the group consisting of (1) silicates of the formula:

$$M_2O \cdot x\, SiO_2 \quad (I)$$

wherein M represents a member selected from the group consisting of alkali metals, —N(CH$_2$OH)$_4$, —N(C$_2$H$_4$OH)$_4$ and —C(NH$_2$)$_2$NH, and $x$ is a number of from 0.5 to 5 inclusive, (2) silicates of the formula (I) modified with at least one of fluorides of silicofluorides of a metal selected from the group consisting of Ca, Al, Mg, Zn and Zr and (3) silicates of the formula (I) modified with at least one of oxides or hydroxides of a metal selected from the group consisting of Al, Ca, Mg, Zr, V, Zn, and Cs, (B) a phosphate type hardener selected from the group consisting of condensed phosphates prepared by heating a mixture of the phosphate of the formula (II):

 (II)

wherein M represents a metal selected from the group consisting of Al, Mg, Ca, Mn, Zn, Fe and Cu, $i$ is 1 or 2 and $j$ is 1 or 3 depending upon the valency (2 or 3) of the metal M and m is a number of from 0.25 to 4 inclusive with at least one double oxides of (i) at least one metal selected from Zn, Mg and Ca and (ii) at least one metal selected from transition metals and metals belonging to Group IV of Periodic Table, the condensed phosphates having been pretreated with at least one of the said silicates (1) or modified silicates (2) and (3) before being mixed with the water soluble silicate (A) and (C) water; and baking the coated layer at a temperature of 150°–250°C until it is hardened.

* * * * *